United States Patent [19]

Noneman

[11] Patent Number: 5,477,227

[45] Date of Patent: Dec. 19, 1995

[54] ADVANCED PARAMETER ENCODER WITH ENVIRONMENTAL FILTER CAPABILITY

[75] Inventor: Mark E. Noneman, Ramona, Calif.

[73] Assignee: TRW Inc., Redondo Beach, Calif.

[21] Appl. No.: 154,907

[22] Filed: Nov. 19, 1993

[51] Int. Cl.$^6$ .................................................. G01S 7/292
[52] U.S. Cl. ............................................ 342/195; 342/13
[58] Field of Search ............................. 342/13, 195, 91, 342/97, 62, 77, 94, 89; 341/67; 395/400; 364/940; 375/342

[56] References Cited

U.S. PATENT DOCUMENTS 4,627,024  12/1986  Whalen et al. ........................... 395/400
5,166,692  11/1992  McClain et al. .......................... 342/195

Primary Examiner—Daniel T. Pihulic

[57] ABSTRACT

In a channelized receiver there is an environmental filter that is used to identify pulse descriptor words that are to be eliminated, tagged for special interest or identifying certain pulse descriptor words that will be accepted causing all other pulse descriptor words to be rejected. The environmental filter has a programmable range and resolution giving the filter a wide flexibility in the identification of a variety of characteristics that can be contained in a pulse descriptor word.

19 Claims, 3 Drawing Sheets

ADVANCED PARAMETER ENCODER WITH ENVIRONMENTAL FILTER CAPABILITY

FIELD OF THE INVENTION

This invention relates to an RF channelized receiver capable of detecting multiple RF pulses of varying amplitude and frequency and wherein the receiver has the ability to screen out pulse descriptor words (PDW's) according to any 12 bit combination of frequency, angle of arrival, pulse amplitude, pulse width and external data.

CROSS-REFERENCE TO RELATED APPLICATION

This application is related to the following four applications:

"Instantaneous Parameter Measuring Receiver" filed on Aug. 20, 1993 by Don Lochhead, with Ser. No. 08/109,804; "Parameter Encoder Architecture" filed on Nov. 19, 1993 by Mark E. Noneman et al.; with Ser. No. 08/154,909; "Advanced Parameter Encoder with Pulse-On-Pulse Detection and Pulse Fragment Reconstruction" filed on Nov. 19, 1993 by Mark E. Noneman et al.; with Ser. No. 08/154,908; and "Advanced Parameter Encoder With Dual Integrated Pulse Present Detection and Channel/Sector Arbitration" filed on Nov. 19, 1993 by Mark E. Noneman et al.; with Ser. No. 08/154,906 all of which are hereby incorporated by this reference.

BACKGROUND OF THE INVENTION

Electronic warfare systems are used on modern military aircraft as part of their offensive and defensive capabilities. These electronic warfare systems emit RF signals that travel through space. Radar systems use RF emissions to locate and track opposing aircraft and some radar systems are incorporated within missiles to assist in the self-guided propulsion of a missile to its target. An electronic warfare search receiver is used defensively to detect those RF emissions. The receiver searches the range of frequencies (the RF spectrum) in which the RF emissions are likely to occur. The receiver then detects and analyzes the nature of the RF signals. By determining the characteristics of the signals received, the defender will know the nature of the threat and, for example, will know if a radar guided missile has "locked on" to the defenders aircraft. These systems are used in friendly as well as unfriendly aircraft. In a tactical or strategic environment, the number of aircraft and the density and diversity of the emissions in the RF spectrum is quite large and is expected to increase. Existing detection and monitoring equipment that use wide band search receivers will find the RF emissions difficult to successfully monitor in such an environment. For instance, on routine missions where airplanes are flying in a pattern, each plane will be emitting its own radar signal to look for hostile or unidentified aircraft. Simultaneously, each aircraft will have on its own search receiver and will be listening for radar signals emitted from other sources which could include hostile airplanes or missiles, ground sources or from ships at sea. The airplane will also receive radar signals from the other airplanes that are flying in its formation. It would be advantageous to identify these signals from the adjacent airplane and filter them out while at the same time listening for radar signals that are of more interest. There may be a variety of signals particularly in an electronically congested area that are of no or little interest. It would be desirable to eliminate these signals after they were identified as not being of interest.

Under certain circumstances, one particular type of waveform or several particular types of waveforms may be of keen interest to the pilot. Under these circumstances it may be advantageous to identify these signals quickly for further action.

Existing window addressable memories (WAM) are used to filter out unwanted signals or identify signals of particular interest. However, these types of filters have a limited window space such as 16 windows for identification of signals to be filtered out or identified for further processing. This type of device has inflexible parameters because parameters must be hard-wired at fixed resolution and range. This type of filter can only cover a limited number of discrete characteristics from the total range that can be covered by a pulse descriptor word (PDW).

It is unlikely that a single receiver type will be capable of meeting all offensive or defensive threat detection and analysis requirements dictated by the future electronic warfare environment. Instead, a set of search and analysis receivers of complimentary capabilities are likely to be required to meet future demands. Trade-offs between probability of intercept, bandwidth, simultaneous signal resolution, sensitivity, receiver complexity and power consumption are necessary. It would be advantageous to have the ability to identify and eliminate or mark for interest a large number of parameters of a pulse descriptor word and at the same time be able to change the requirements for identification as the environment changes.

SUMMARY OF THE INVENTION

The invention is a method and apparatus for identifying and filtering out pulse descriptor words which are of no interest or for identifying pulse descriptor words that are of a particular interest. The invention is used in the environment of a channelized receiver used to receive and measure the signal parameters of RF pulses including frequency, time of arrival, pulse width, pulse amplitude and angle of arrival. Pulse descriptor words can be of varying length but typically are between 96 bits and 256 bits long. Each pulse descriptor word contains a large amount of information about the RF signals that have been received. For example, in a pulse descriptor word there may be 20 bits of reserved space for frequency information. However, to identify a signal with a frequency of interest, it may be only necessary to identify the 12 most significant bits. This is true because the eight least significant bits of the frequency portion of the pulse descriptor word provide frequency resolution that is not necessary for identification of pulses having a particular frequency of interest. Conversely, the most significant bits of frequency may not be necessary if the receiver is known to be tuned to a relatively narrow bandwidth. In this case, more of the less significant bits could be used to examine a finer resolution of frequency. The pulse descriptor word also has a number of bits reserved for angle of arrival, pulse amplitude and pulse width. Again, for each of these parameters, the pulse descriptor word has more bits than are necessary to flag a pulse descriptor word that has a particular angle of arrival, pulse amplitude or pulse width. The environment filter of the present invention determines the maximum number of bits that will be useful in identifying any particular parameter and limits the pulse descriptor word to those number of bits. For instance, if the pulse descriptor word had 20 bits of frequency information, the environmental filter may transform this number of bits to 12 because 12 is the maximum number of bits of frequency resolution that are necessary to identify the frequency parameter. This process is repeated for the angle of arrival, the pulse amplitude and the pulse width with one other channel that can be used for miscellaneous identifications. Each bit group is transformed in size to the maximum number of bits that could possibly be useful for identifying a particular parameter. After this is done, the group of transformed bits for all parameters is again reduced to a total of, for instance, 12 bits. These 12 bits can represent 12 bits of frequency or three bits of frequency, three bits of angle of arrival, three bits of pulse amplitude and three bits of pulse width. It can also be programmable to have, for instance, 6 bits of angle of arrival and 6 bits of frequency or any combination that is desired. Once the pulse descriptor word has been reduced to a total of 12 bits, the 12 bits are compared to a programmable look-up table that has a maximum of 4,096 positions. This provides a vast increase in the number of signal parameters that can be identified for elimination or special consideration. The system provides further flexibility in that both bit transformations are programmable and therefore provide a large flexibility in identifying any information in a pulse descriptor word that could possibly be or interest.

Therefore, it is an object of the present invention to provide a channelized receiver with a capability of identifying and filtering out or targeting for special interest various combinations of data contained in pulse descriptor words. It is another object of the present invention to be able to eliminate multiple signal detections that have already been identified as not of interest. It is a further object of the present invention to provide an environmental filter with programmable flexibility so that a large amount of the information contained in the pulse descriptor word can be targeted and identified for either elimination or special handling. The foregoing objects and advantages of the invention together with the structure and characteristics thereof, briefly summarized in the foregoing passages, become more apparent to those skilled in the art upon reading the detailed description of the preferred embodiment taken together with the following illustrations.

DETAILED DESCRIPTION OF THE PREFERRED EMBODIMENT

The present invention is a portion of a channelized receiver that acts as an environmental filter for identifying PDW's for elimination or special processing. The novel environmental filter and method will now be described.

Figure 1:
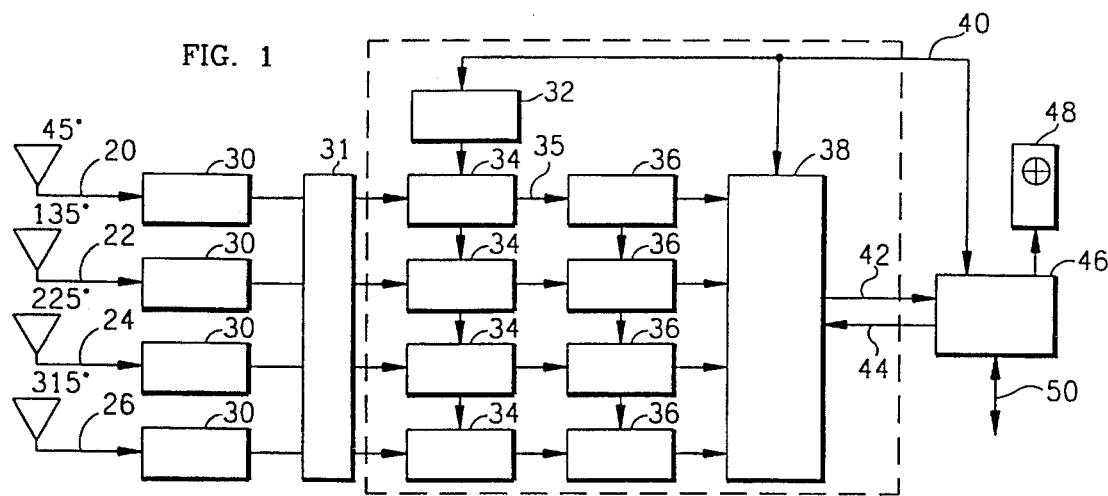
FIG. 1 is a simplified block diagram of an overall channelized receiver system.

FIG. 1 is an overall block diagram of a channelized receiver that would be employed in an aircraft to receive, detect and analyze RF signals from a variety of possible emission sources including enemy aircraft, enemy missiles and fixed radar locations.

Turning now to FIG. 1, FIG. 1 is an overall block diagram of a channelized receiver in which the present invention can be used. This is an illustration of the type of receiver that would suitable for the present invention although the present invention can be used in other types of receivers such as narrow band single channel and interferometer receivers. Antennas 20, 22, 24 and 26 represent the four antennas that would typically be used to cover 360° of spatial domain surrounding an aircraft. Each antenna receives signals from approximately 90° of air space to cover the entire 360° range. The receivers 30 are identical and receive the signals intercepted by antennas 20–26. The receivers 30 are typically wide band, front end low noise amplifiers that are placed close to the antennas to minimize noise interference that could be introduced through long cable connections. Bus 40 is a command and control bus that is used to coordinate and control the overall function of the channelized receiver. Each output of the receiver is connected to an IF switch 31 and tuner 34. Local oscillator 32 is connected to each of the tuners 34 to provide the tuners with the ability to select IF frequency bands and down convert a bandwidth from, for instance, 6 to 7 gigahertz for an individual receiver to 0.5–1.5 gigahertz. The output bandwidth of each tuner 34 is connected to one of the four channelizers 36. The channelizers 36 consist of a number of adjacent band-pass filters that are used to discriminate between signals that may be contained in various frequencies across the spectrum selected by the IF tuner. Each of these band-pass filters can cover a frequency range of from 20 to 100 MHz and typically will have a crossover with its adjacent filter at −1 dB of attenuation. The outputs of the channelizers are connected to the parameter encoder module 38 which is ultimately responsible for producing a pulse descriptor word for each separate signal that has been received across the frequency spectrum covered by antennas 20–26 and receivers 30. The pulse descriptor word which is a long digital word describing the individual characteristics of each received signal is transferred to an emitter identification processor 46 that determines the nature and possible significance of any signal that is received. The emitter identification processor 46 then transfers information concerning the received signal to a cockpit display 48, for instance, or via line 50 to an aircraft controller. FIG. 1 is intended to identify an overall system in which the present invention is useful.

Figure 2:
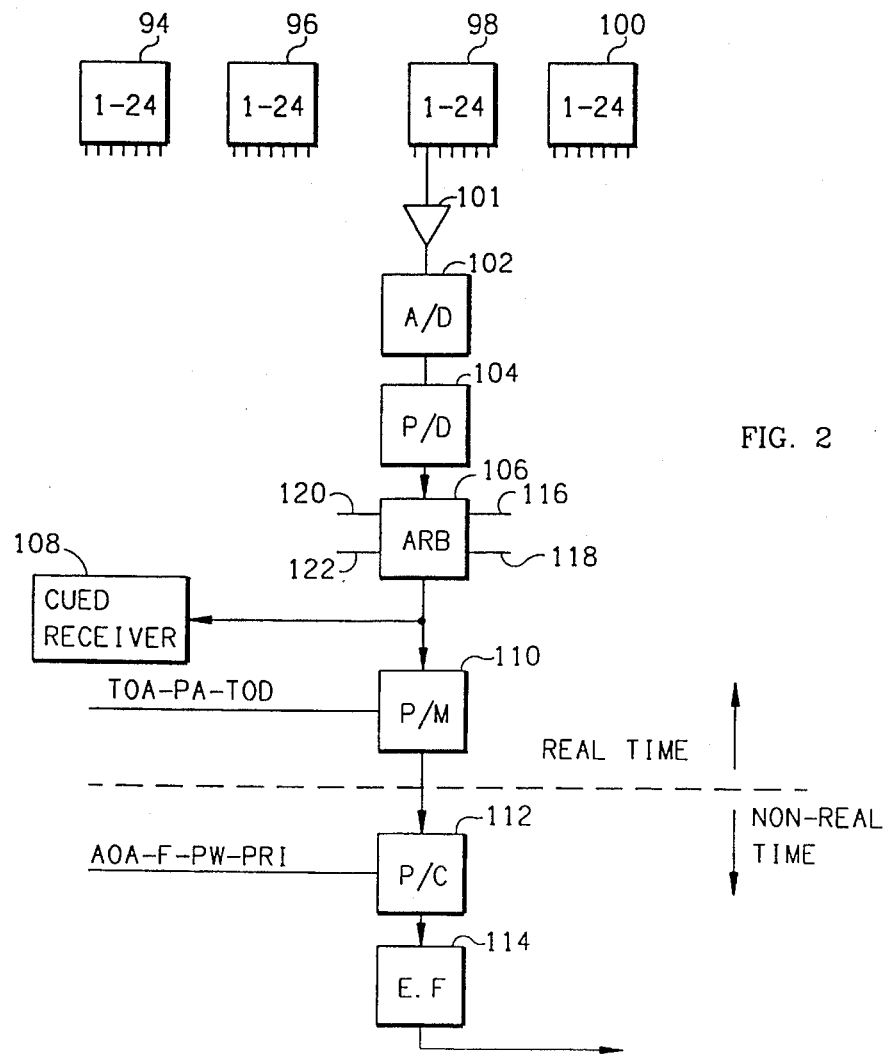
FIG. 2 is a more detailed block diagram showing the location of the environmental filter.

FIG. 2 is a more detailed block diagram of the portion of the channelized receiver in which the invention is useful. Channelizers 94, 96, 98 and 100 represent the four sectors of the channelized receiver. Each sector has 24 channels which can be expandable if desired. One of the channels in channelizer 98 is shown connected to its string of processing circuits which will now be discussed. All outputs of the channelizers 94, 96, 98 and 100 are connected to logrithmic amplifier detectors 101. There are 96 logrithmic amplifier detectors 101 which are connected to channelizers 94, 96, 98 and 100. Similar, there are 96 A/D converters 102 and 96 pulse detectors 104. There are also 96 arbitration modules 106 which are used to arbitrate between both channels and sectors to eliminate spurious and false signals. The A/D converter 102 converts pulse amplitude information to a digital signal which represents the instantaneous amplitude present in the channel. This instantaneous amplitude is sampled on a periodic basis such as every 20 nanoseconds or every 50 nanoseconds. The digital amplitude information is transferred to pulse detection module 104 which is used to detect the arrival of a pulse, when a pulse is stable and when a pulse has terminated. The arbitration module 106 uses this information to eliminate false pulses. After the arbitration is complete, the digital information representing the received pulse is transferred to the parameter measurement block 110. This block determines the time of arrival, pulse amplitude and time of departure of a particular signal. This determination is made in real time which allows accurate and consistent representation of those parameters. There are 96 of the parameter measurement modules 110. Parameter calculations such as angle of arrival, frequency, pulse width and pulse repetition interval are made in parameter calculator 112. An environmental filter can be located in the parameter calculator 112 or it can be a separate environmental filter module shown as module 114. The environmental filtering is not performed in real time as indicated in FIG. 2. The environmental filter screens out pulse descriptor words for signals of interest and rejects signals not of interest. At this stage in the architecture, the 96 outputs of the parameter measurement modules 110 are combined into fours to produce, for example, 24 outputs. Eight of these outputs are combined together and there are three parameter calculation modules 112 each having eight inputs and one output. The parameter calculators are not required to calculate their pulse parameters in non-real time in order to reduce the number of resources thereby reducing cost, weight and power. After the channels have been combined by the pulse calculators, which can contain environmental filters, the signal is passed through the environment filter 114 to screen out signals that are not of interest and target signals that are of interest. A pulse descriptor word is shown in FIG. 3.

Figure 3:
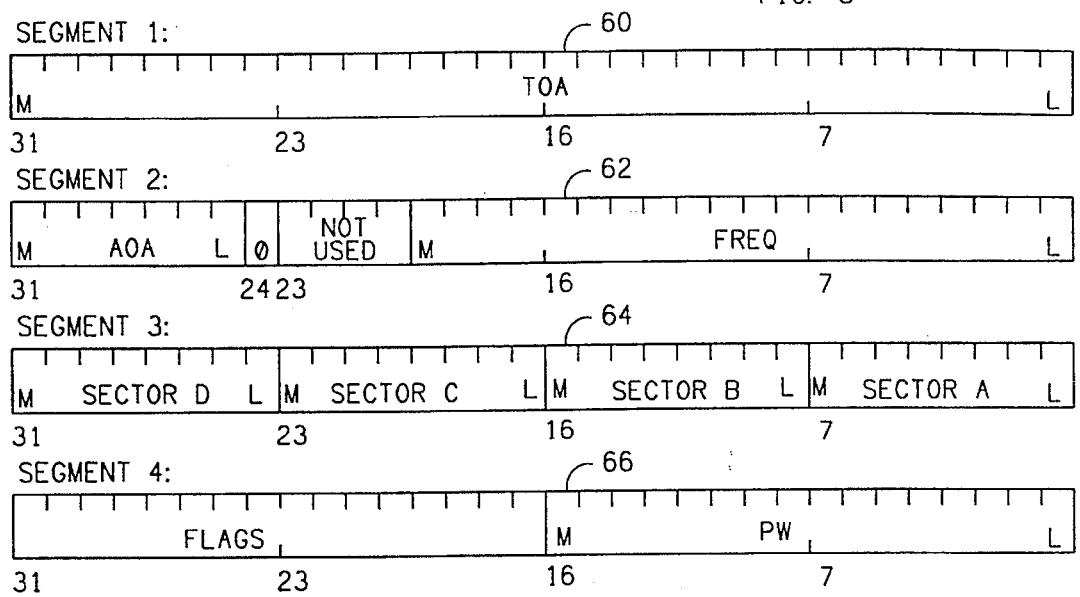
FIG. 3 is a pulse descriptor word diagram showing where parameter information is located in the pulse descriptor word.

FIG. 3 shows an example bit map for a pulse descriptor word. The bit map shows four segments, namely segment 60, 62, 64 and 66. Each segment is 32 bits long with the most significant bit on the left and the least significant bit on the right. In the following description, TOA refers to time of arrival, AOA refers to angle of arrival, F corresponds to frequency, PA refers to pulse amplitude and PW refers to pulse width. Segment 60 has 32 bits of TOA information and segment 62 has 7 bits of AOA information. One bit is set to zero, four of the bits are not used, and 20 of the bits are for frequency information. Segment 64 has 32 bits of pulse amplitude information, 8 bits for Sector A, 8 bits for Sector B, 8 bits for Sector C and 8 bits for Sector D. The sectors correspond to the channelizers 94, 96, 98 and 100. Segment 66 has 16 bits that are used as flags and 16 bits that are used as pulse width information. The most significant bits for the TOA, AOA, F, PA and PW are on the left and the least significant bits are on the right. As shown, the pulse descriptor word in total contains a large amount of information. It is not necessary to use all of that information to identify pulse descriptor words that should be eliminated or identified for special treatment.

Figure 4:
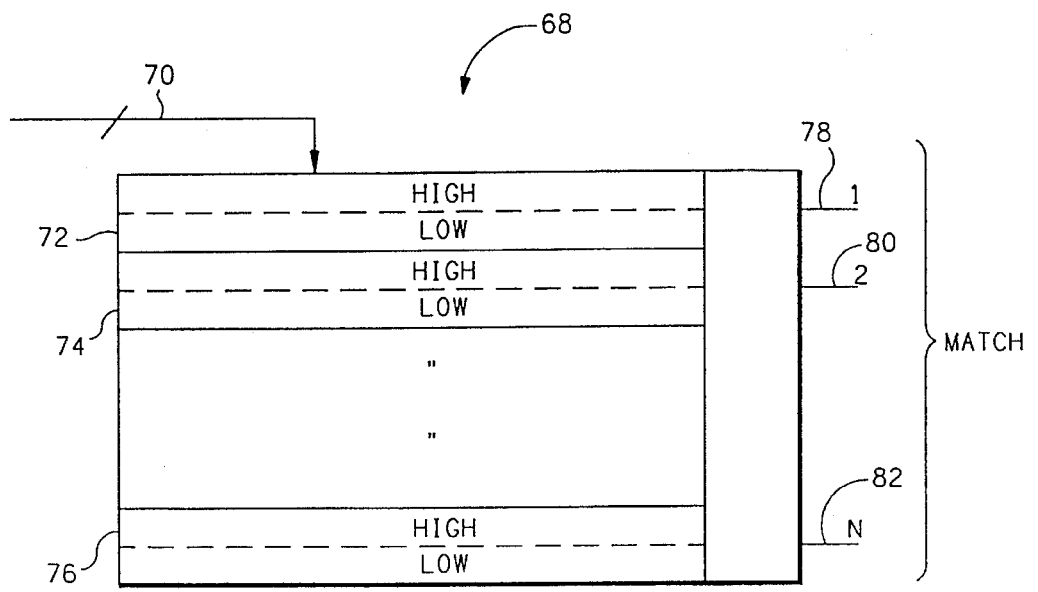
FIG. 4 is a prior art diagram of a window addressable memory.

FIG. 4 is a prior art diagram of a window addressable memory (WAM) that has been used to identify pulse descriptor words with particular pulse characteristics. WAM 68 accept input PDW data in parallel via lines 70. A typical WAM has 16 windows. Shown in FIG. 4 are windows 72 and 74. Window 76 is designated as N or the last window in the module. Each window is 32 bits long and 2 bits high. When pulse descriptor word data arrives, the data is transferred in parallel through all the windows of the filter. As the data passes through each window, the WAM looks to see if the data falls within the high and low window limits of any of the windows. If there is a match between the input PDW data and the preprogrammed window data then a true signal appears on the match lines designated as outputs 78, 80 and 82. This type of filter is limited in space in that there are only 16 windows. This is inconvenient because in a particular environment, the radar receiver will operate most efficiently if it can eliminate a great number of signals and at the same time identify important signals for special handling. These needs may far exceed the 16 windows that are available. The parameters of the WAM are inflexible in that the definition of the window limits are not programmable and are fixed by hard-wired connection. The WAM's define a limited number of discrete pulse descriptor word parameters that can be identified at any given time.

Figure 5:
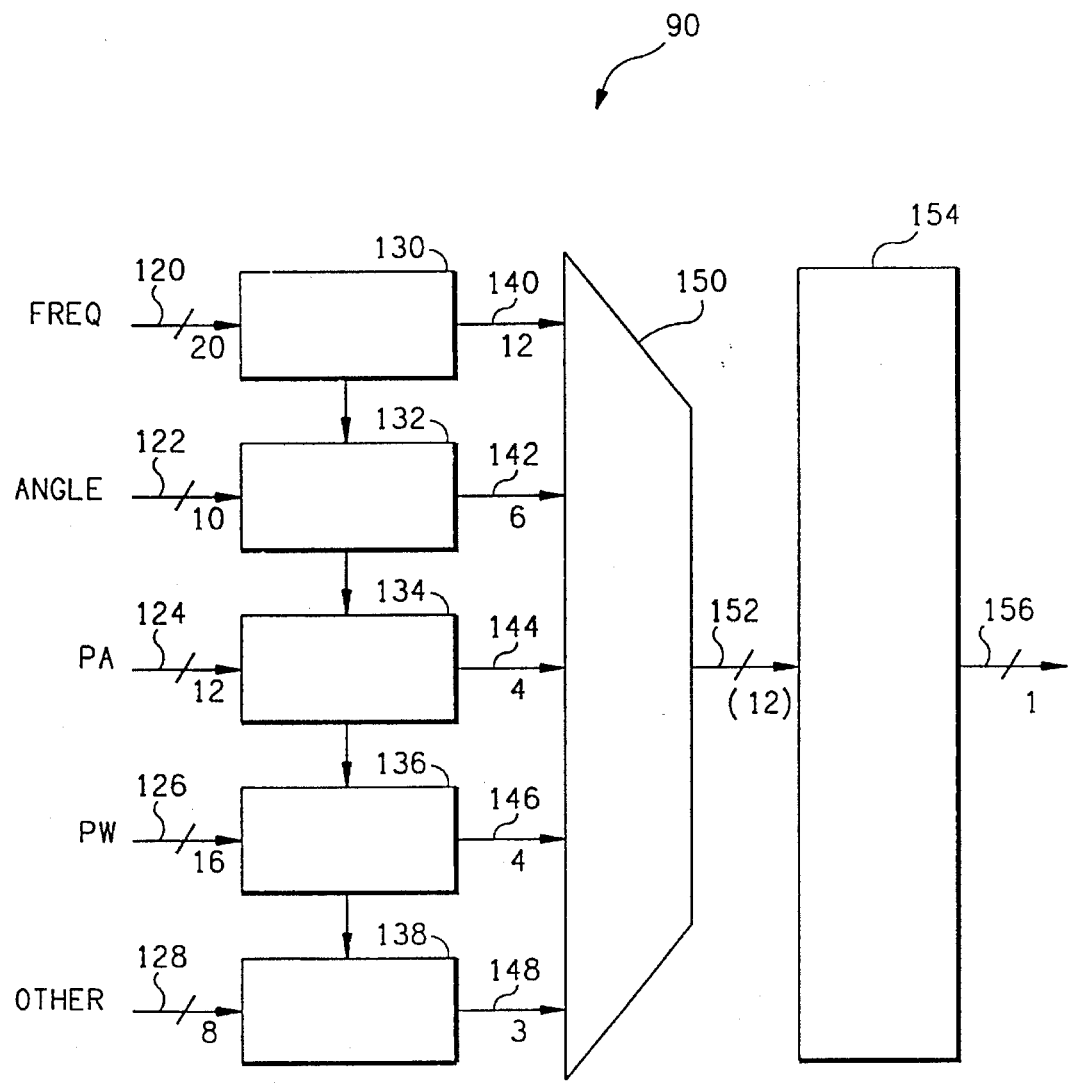
FIG. 5 is a block diagram of the environmental filter of the present invention.

FIG. 5 is a block diagram showing the environmental filter of the present invention. The environmental filter comprises range and resolution transform modules 130, 132, 134, 136 and 138. Each of these modules is programmable as will be discussed later. Data selecter 150 accepts the outputs of all five of the range and resolution transforms and puts a 12 bit data word out on line 152. The filter look-up table 154 compares the data on line 152 with the data in the look-up table and outputs either a zero or a one. A zero indicates that there is no correlation between the data in the look-up table 154 and the culled data from the pulse descriptor word on line 152. A one indicates that there is a match. The environmental filter 90 can filter pulse descriptor words based on frequency, angle, pulse amplitude and pulse width characteristics. There is also a provision on line 128 for other data to be filtered, if necessary. Such data could include temperature, aircraft attitude, or detected phase modulation. Frequency, angle, pulse amplitude and pulse width data from the pulse descriptor word are fed into range and resolution transforms 130, 132, 134 and 136 respectively on lines 120, 122, 124 and 126. Other information relating to the pulse descriptor word can be fed to range and resolution transformer 138 on line 128. The frequency information fed to range and resolution transformer 130 on line 120 consists of 20 bits of frequency information. It was predetermined that the maximum number of bits that would be necessary to screen the frequency characteristics of a PDW would be 12 bits. Therefore, the 20 bits of information on line 120 are reduced to 12 bits of consecutive frequency information on line 140. Similarly, the 7 bits of angle information on line 122 is reduced to 4 bits on output line 142. The 8 bits of pulse amplitude information on lines 124 are reduced to 4 bits on lines 144. The 16 bits of pulse width information on lines 126 is reduced to 4 bits of pulse width information on lines 146. The respective outputs on lines 140, 142, 144, 146 and 148 represent the maximum number of bits for each particular parameter that it is necessary to look at to be able to screen any pulse descriptor word of interest. It is important to note that the range and resolution transformers 130, 132, 134, 136 and 138 are programmable. For instance, the 20 bits of frequency information on line 120 will be reduced as to as much as 12 bits on line 140. The range in resolution block 130 can select any 12 consecutive bits from the information on line 120. For instance, it could select 12 consecutive bits starting at the least significant bit and moving up or it could select 12 consecutive bits starting at the most significant bit and going down. The selection of 12 consecutive bits could start at any point where there is room to finish. Also, the range and resolution transform 130 can select any number of consecutive bits between 0 and 12. For instance, if only 6 bits of frequency information were necessary to identify the particular waveform characteritic then the range and resolution transform 130 could select bits 7–12 or 3–8 as desired. Also, if the most significant of the 20 input bits are not used, a ceiling function is applied such that if the magnitude of the input word is greater than the capacity of the output word, the output word will be forced to all ones. The same sort of selection process is possible in the other range and resolution transforms 132, 134, 136, and 138. Non-linear transforms are also possible. For example, the 16 bits of PW can be completely transformed into 4 bits by using an offset priority encoder such that the output code indicates the most significant input that is a one.

The data selected by the range and resolution transforms 130–138 is output on lines 140–148. These lines are connected to the input of data selecter 150. The data selecter further reduces the number of bits that have been selected. There is a maximum of a 12 bit parallel output on line 152. These bits can represent a wide range of combinations of the bits input on line 140–148. For instance, these 12 bits could represent 6 bits of frequency information, 3 bits of angle information and 3 bits of pulse width information. It could also represent, for example, 2 bits of frequency information, 4 bits of angle information and 3 bits of pulse amplitude information and 3 bits of pulse width information. As long as the total number of used bits is 12 or less, any combination is possible. Next, there is a comparison of this 12 bit word to the information contained in the filter look-up table 154. The filter look-up table 154 is programmable and can contain up to 4,096 bit combinations that can correspond up to 4,096 pulse descriptor word parameter characteristics. The environmental filter can be used to filter out specific pulse descriptor words that are unwanted, identify pulse descriptor words that are of a particular interest or it can identify only specific pulse descriptor words and cause all other pulse descriptor words to be rejected. The number of possible look-up combinations can be easily increased by making the table larger and selecting more bits via data selecter 150. This invention provides a significant amount of flexibility for an environmental filter. This is accomplished through the programmability of the range and resolution transforms, the data selecter and the filter look-up table.

It is believed that the foregoing description of the preferred embodiment of the invention is sufficient in detail to enable one skilled in the art to make and use the invention. However, it is expressly understood that the details of the elements that are presented are not intended to limit the scope of the invention inasmuch as equivalence to those elements and other modifications thereof all of which come within the scope of the invention, become apparent to those skilled in the art upon reading this specification. Thus, the invention is to be broadly construed within the full scope of the appended claims.

What is claimed is:

1. An environmental filter comprising:

input means for accepting digital data, range and resolution means, connected to said input for accepting the digital data in consecutive bits from said input, said range and resolution means for selecting at least one consecutive string of bits of variable size and having a variable starting point contained within said consecutive bits on said input means, the output of said range and resolution means having fewer digital bits than the input to said range and resolution means.

2. The environmental filter of claim 1 including:

data selecter means having a first data input connected to the output of said range and resolution means for accepting data from said range and resolution means, said data selecter means having a second input for accepting digital data from a second range and resolution means, said data selection means selecting a programmable amount of digital data from one or both of said range and resolution means and combining said data and transferring said data to an output, filter means connected to said data selection means and containing a plurality of programmable digital data in segments, each segment of said data corresponding in length to the length of the output data from said data selecter means, said filter means for comparing the input data from the data selecter means to the programmable data stored in said filter means and determining if there is a match between the two sets of data.

3. The environmental filter means of claim 2 including:

a plurality of range and resolution means each having inputs and outputs, the outputs of said range and resolution means connected to said data selecter means, said data selecter means for programming a selectable amount of data from each of said range and resolution means and combining said data into a predetermined length digital word for transfer and comparison to the information stored in said filter means.

4. The environmental filter of claim 4 wherein:

the input information to said range and resolution means comprises digital data from a pulse descriptor word.

5. The environmental filter of claim 4 wherein:

the digital information in said pulse descriptor word corresponds to frequency, angle, pulse amplitude, pulse width, said information corresponding to electronic signals from a channelized receiver.

6. The environmental filter of claim 5 including:

range and resolution means for accepting digital data not contained in a pulse descriptor word for transferring a portion of said data to said data selecter means for potential consolidation with the data from the other range and resolution means.

7. An environmental filter for a digital parameter encoder which generates pulse descriptor words (PDWs) including a plurality of strings of consecutive digital bits each of said plurality of strings of consecutive digital bits representing a signal characteristic, comprising:

transform means for receiving said plurality of strings of consecutive bits and for transforming each string of said plurality of strings of consecutive digital bits into a transformed string of bits; and data selection means, coupled to said transform means, for selecting consecutive bits of variable length from said transformed strings and for combining said selected consecutive bits into a characteristic comparison string.

8. The environmental filter of claim 7 further comprising:

look-up means, coupled to said data selection means, for storing filter characteristic strings, for comparing said characteristic comparison string to said filter characteristic strings, and for generating a match signal if each bit of said characteristic comparison string matches one of said filter comparison strings.

9. The environmental filter of claim 8 wherein said characteristic comparison string and said filter comparison strings each have N bits.

10. The environmental filter of claim 8 wherein said PDWs include M characteristics and said transform means includes M transform modules.

11. The environmental filter of claim 10 wherein said transform modules, said data selection means and said look-up means are programmable.

12. The environmental filter of claim 7 wherein said signal characteristics include at least two of frequency, angle, pulse amplitude, and pulse width.

13. The environmental filter of claim 7 wherein at least one transformed string of bits has fewer bits than said string of consecutive digital bits.

14. An environmental filter for a digital parameter encoder which generates pulse descriptor words (PDWs) including a plurality of strings of consecutive digital bits each of said plurality of strings of consecutive digital bits representing a signal characteristic, comprising:

a plurality of transform modules each for receiving one of said plurality of strings of consecutive digital bits and for transforming and reducing said one of said strings of consecutive digital bits into a transformed string of digital bits having fewer digital bits;

a data selecter, coupled to said plurality of transform modules, for selecting at least one bit from at least two of said transformed strings to form a characteristic comparison string; and look-up table, coupled to said data selecter, for storing filter characteristic strings, for comparing said characteristic comparison string to said filter characteristic strings, and for generating a match signal if each bit of said characteristic comparison string matches one of said filter comparison strings.

15. The environmental filter of claim 14 wherein said plurality of transform modules, said data selecter and said look-up table are programmable.

16. A method of filtering signal characteristics of pulse descriptor words (PDWs) generated by a digital parameter encoder, wherein each of said signal characteristics comprises a string of consecutive digital bits, comprising the steps of:

receiving said plurality of signal characteristics;

transforming and reducing each string of consecutive digital bits of said plurality of signal characteristics into a transformed string of digital bits having fewer digital bits;

selecting consecutive bits from said transformed strings;

combining said selected consecutive bits into a characteristic comparison string;

comparing said characteristic comparison string to stored filter characteristic strings; and generating a match signal if each bit of said characteristic comparison string matches one of said filter comparison strings.

17. The method of claim 16 wherein said characteristic comparison string and said filter comparison strings each have have N bits.

18. The method of claim 16 wherein said PDWs include M characteristics and said transform means includes M transform modules.

19. The method of claim 16 wherein said signal characteristics include at least two of frequency, angle, pulse amplitude, and pulse width.

* * * * *